United States Patent [19]

Pruett et al.

[11] Patent Number: 4,803,255

[45] Date of Patent: Feb. 7, 1989

[54] LIGNIN AND LIGNIN DERIVATIVES AS COPOLYMERIZABLE COLORANTS FOR POLYESTERS

[75] Inventors: Wayne P. Pruett; John A. Hyatt, both of Kingsport; Samuel D. Hilbert, Jonesborough, all of Tenn.

[73] Assignee: Eastman Kodak Company, Rochester, N.Y.

[21] Appl. No.: 64,646

[22] Filed: Jun. 22, 1987

[51] Int. Cl.$^4$ .................... C08H 5/02; C08G 63/02
[52] U.S. Cl. .................................... 527/400
[58] Field of Search ......................... 527/400

[56] References Cited

U.S. PATENT DOCUMENTS 4,017,474  4/1977  Glasser et al. ................. 527/400
4,042,546  8/1977  Simon ........................... 527/400

*Primary Examiner*—John Kight
*Assistant Examiner*—Frederick Krass
*Attorney, Agent, or Firm*—S. E. Reiter; John F. Stevens; William P. Heath, Jr.

[57] ABSTRACT

Colored shapable polyesters having copolymerized therein lignin or lignin derivatives are prepared by condensing the lignin or lignin derivatives into the polyester backbone during the polymerization reaction. The lignin moieties are thermally stable at the polymer processing temperatures and are nonextractable from the polyester backbone. These colored, shapable polyesters are particularly suitable for use in food, beverage, pharmaceutical, or cosmetic container applications.

27 Claims, No Drawings

LIGNIN AND LIGNIN DERIVATIVES AS COPOLYMERIZABLE COLORANTS FOR POLYESTERS

FIELD OF THE INVENTION

The present invention relates to polyesters having lignins or lignin derivatives copolymerized therein to impart color thereto and to a process for preparing the colored polyesters.

BACKGROUND OF THE INVENTION

Since polyester containers such as food containers, beverage bottles, pharmaceutical containers, cosmetic containers and the like made of polyester plastic materials combine the advantages of low cost and durability with ease of fabrication, there is an increasing demand for polyester containers. In many applications the polyester containers must be colored not only to make the container aesthetically pleasing, but also to minimize light transmittance and thereby protect the container contents from light degradation. As a result, several colorants have been developed for polyesters used in the container industry. However, present colorants suffer from a number of important disadvantages. For example, some dyes and pigments used to color polyesters are costly and thereby greatly add to the cost of the containers. Other colorants, such as iron oxide, cause the polyester to become clouded thereby obscuring from view the container contents. Still other colorant systems allow high light transmittance in the ultraviolet light range, e.g. 300 nm. to 450 nm., which tends to degrade the light sensitive contents of the container. Finally, other colorants tend to leach from the polyester container into the container contents and therefore cannot be used with foods, drugs and cosmetics.

Accordingly, it is an object of the present invention to provide a polyester colorant that is non-extractable from the polymer.

It is a further object of the present invention to provide a colored polyester which exhibits low light transmittance in the ultraviolet range.

It is a still further object of the present invention to provide a low cost, amber-colored polyester having greater clarity than other amber-colored polyesters.

These and other objects of the present invention will be apparent to one of ordinary skill in the art from the summary and detailed description which follows.

SUMMARY OF THE INVENTION

The present invention relates to a shapable, colored copolymer of a polyester having chemically linked into the polyester backbone color-imparting amounts of a compound selected from lignin and lignin compounds having functional groups chemically linkable with the polyester backbone.

Another embodiment of the present invention relates to a process for preparing a colored copolymer of a polyester having chemically linked into the polyester backbone color-imparting amounts of a compound selected from the group consisting of lignin and lignin compounds having functional groups chemically linkable with the polyester backbone. The process includes the steps of polymerizing at least one diol with at least one compound selected from dicarboxylic acids, esters of dicarboxylic acids and anhydrides of dicarboxylic acids, in the presence of color-imparting amounts of a compound selected from lignin and lignin compounds which can be chemically linked in a polyester backbone, and recovering the resultant polyester.

A third embodiment of the present invention relates to an article of manufacture, including containers useful in the packaging of foods, beverages, cosmetics and pharmaceuticals made from the polyester of the present invention.

DETAILED DESCRIPTION OF THE PREFERRED EMBODIMENTS

Lignin used to provide the colored polyester materials of the invention is a well known compound and is produced commercially by pulping processes which are well documented in the literature. Useful colorant lignins include Kraft lignin, steam explosion lignin, acid hydrolysis lignin, organosolv lignin and the like. The lignin derivatives which may also be used as colorants in the present invention have functional groups which will condense during polymerization into a polyester backbone as, for example, carboxy, ester, hydroxy and hydroxyalkoxy. Thus, without limitation, useful lignin derivatives of the present invention include lignin esters, lignin ethers, carboxy lignins, hydroxyalkoxy lignins and the like. More specifically, the lignin derivatives include lignin acetate, lignin propionate, lignin butyrate, lignin ethyl ether, lignin methyl ether, carboxymethyl lignin, (hydroxyethoxy) lignin, (hydroxypropoxy) lignin and the like. It should be understood that the ester lignin derivatives can be fully oxyacylated yet still be incorporated into the polyester by ester interchange. The lignin ether derivatives, however, would be prepared under conditions leading to etherification of lignin phenolic hydroxyls only, leaving the aliphatic hydroxyls free to react in the polycondensation stage. Other lignin derivatives suitable for use in the present invention and their prepartion are discussed in Sarkanen and Ludwig, *Lignins: Occurrence, Formation, Structure, and Reactions,* Wiley-Interscience, New York, 1971, hereby incorporated by reference.

The colorants of the invention are chemically linked and incorporated in the polyester backbone during the copolymerization by a condensation reaction either through esterification or by ester interchange. The polyesters of the present invention may be linear, thermoplastic, crystalline, or amorphous polyesters and are produced by copolymerizing one or more diols and one or more dicarboxylic acid esters or anhydrides thereof in the presence of lignin or lignin derivatives. In general, the diol components contain 2 to 18, preferably 2 to 12 carbon atoms. Illustrative of suitable diol components are ethylene glycol, 1,4-cyclohexanedimethanol, 1,2-propanediol, 1,3-propanediol, 1-2-butanediol, 1,3-butanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, 3,8-bis(hydroxymethyl) tricyclo-[5.2.1.0]-decane, 4,8-bis(hydroxymethyl) tricyclo-[5.2.1.0]-decane, 5,8-bis(hydroxymethyl) tricyclo-[5.2.1.0]-decane and diols containing one or more oxygen atoms in the chain such as diethylene glycol, triethylene glycol, dipropylene glycol, tripropylene glycol and the like. Cycloaliphatic diols can be employed in their cis- or trans-configuration or as a mixture of both forms. The dicarboxylic acid components are preferably aliphatic, alicyclic, or aromatic dicarboxylic acids, including the anhydrides and esters of the dicarboxylic acids. Examples of acid components of the polyester of the invention are terephthalic acid, isophthalic acid, 1,4-cyclohexanedicarboxylic acid, 2,6 naphthalene dicarboxylic acid, 1,3-cyclohexanedicarboxylic acid, succinic acid, glutaric acid, adipic acid, sebacic acid, 1,12-dodecanedioic acid and the like, and the anhydrides and esters thereof. Also, in place of the dicarboxylic acids it is possible, and often preferable to use functional acid derivatives of the dicarboxylic acids such as the dimethyl ester, diethyl ester and dipropyl ester of the dicarboxylic acid. The polyesters of the present invention are prepared using typical polycondensation techniques that are well known in the art. Generally, 2 moles of diol per one mole of dicarboxylic acid are placed in a reaction vessel with a color-imparting amount of a colorant selected from lignin, at least one lignin derivative, or mixtures thereof, and a polycondensation catalyst. The reaction vessel is heated with stirring and with a nitrogen sweep over the reaction mixture to distill off the theoretical amount of water or alcohol from the reaction vessel. The reaction vessel is then heated for an additional time period at reduced pressure, removed from the heat and allowed to cool in a nitrogen atmosphere to solidify the colored polyester.

A preferred catalyst for use in the above reaction is a solution of acetyltriisopropyl titanate which contains 0.03 grams of titanium per milliliter. However, other polycondensation catalysts commonly employed in polyester formation condensation reactions may be used as well.

The amount of lignin and lignin derivatives copolymerized with the diol and diacid components of the invention can vary but in all instances will be an amount sufficient to impart an amber color to the resulting polyester. Normally, the amount of lignin of lignin derivative will fall in the range of 0.05 to about 10 weight percent of the resultant polyester, preferably about 0.1 to about 5 weight percent of the resultant polyester.

From experimentation it has been determined that the best mode of the present invention is represented by linear thermoplastic polyesters having an inherent viscosity of about 0.4 to about 1.2. The preferred acid reactant comprises at least 50 mole percent terephthalic acid and the preferred diol reactant comprises at least 50 mole percent ethylene glycol or 1,4-cyclohexanedimethanol. The preferred polyesters include about 0.1 to about 5 weight percent of a copolymerizable lignin or lignin derivative.

The colored copolymers of the present invention including lignin and lignin derivatives are shapable and thermally stable at polymer processing temperatures. Therefore, the colored copolymer of the invention can be shaped using polymer-shaping processes well known in the art. These polymer-shaping process include, for example, molding, fiber or sheet forming and the like. The greatest utility for the novel polyesters of the invention however will be as container bottles and the like. Thus, the colored polyesters of the present invention are suitable for use in food containers, beverage bottles, pharmaceutical containers, cosmetic containers and the like. The polyesters of the invention are particularly useful for the above applications because the color-inducing lignin or lignin derivative is not extractable from the polyester product and does not leach out of containers of the polyester into the container contents. Another advantage of the lignin colorant is its low cost in comparison to other colorants presently in use. In addition, the amber-colored polyester incorporating the lignin or lignin derivative exhibits greater clarity as compared to amber-colored polyesters prepared using colorants such as iron oxide. The amber colored polyesters of the present invention also exhibit low light transmittance at ranges of 300 nm to 450 nm as compared to colored copolymers using other colorant systems. Accordingly, the polyester of the invention provides light sensitive container contents greater protection from damaging light in the ultraviolet range.

The following two examples illustrate the preparation of lignin derivatives;

EXAMPLE 1

Preparation of Lignin Acetate

A mixture of 100.0 g of lignin, 500 mL of acetic acid, 100 g of acetic anhydride, and 0.5 g of sodium acetate was stirred at ambient temperature for 48 hours, poured into 2 litres of water, and the precipitated lignin acetate was recovered by filtration. This lignin acetate (yield, approximately 108 g) was shown by analysis to contain 13.3.% acetyl by weight.

EXAMPLE 2

Preparation of (2-Hydroxyethoxy) Lignin

A solution of 100 g of lignin in 600 mL of water containing 40.0 g of sodium hydroxide was treated with 75.0 mL of ethylene oxide and stirred at 120° C. for 8 hours. The resulting reaction mixture was acidified and filtered to give 102 g of solid product. A sample of this (2-hydroxyethoxy) lignin was fully acetylated with acetic anhydride in pyridine and analyzed by $^1$H NMR spectroscopy and acetyl analysis. The sample contained 14.1% acetyl, all of which was aliphatic according to the NMR analysis.

Typical amber-colored polyesters prepared in accordance with this invention are as follows:

EXAMPLE 3

Preparation of Poly(ethylene terephthalate) Copolymerized with 0.9 wt % Lignin A total of 97 g (0.5 moles) of dimethyl terephthalate, 62 g (1.0 mole) ethylene glycol, 0.87 g (0.9 wt %) lignin, and 0.29 mL of an n-butanol solution of acetyltriisopropyl titanate which contains 0.03 g Titanium per mL is placed into a 500-mL, single-neck, round-bottom flask equipped with a nitrogen inlet, stirrer, vacuum outlet, and a condensing flask. The flask is heated with stirring at 200° C. in a Belmont metal bath for 1 hour and at 210° C. for 2 hours with a nitrogen sweep over the reaction mixture. When the theoretical amount of methanol has distilled from the reaction mixture, the metal bath temperature is increased to 280° C. The flask is heated at 280° C. at a reduced pressure of 0.5 to 0.1 mm mercury for 35 minutes. The flask is removed from the bath and is allowed to cool in a nitrogen atmosphere while the polyester solidifies. The flask is broken, the polyester is removed from the stirrer, and the polyester is ground to pass 3 mm using a Wiley mill. The ground polyester has an inherent viscosity of 0.86 determined at 25° C. in a 60/40 weight mixture of phenol/tetrachloroethane at a concentration of 0.5 g/100mL. Amorphous film of the polyester is bright amber colored.

EXAMPLE 4

Preparation of Poly(ethylene terephthalate) Copolymerized with 0.6 wt. % Acetylated Lignin A total of 97 g (0.5 moles) dimethyl terephthalate, 62 g (1.0 mole) ethylene glycol, 0.58 g (0.6 wt %) acetylated lignin, and 0.29 mL of a n-butanol solution of acetyltriisopropyl titanate which contains 0.03 g Titanium per mL is placed into a 500 mL, single-neck, round-bottom flask equipped with a nitrogen inlet, stirrer, vacuum outlet, and a condensing flask. The ester interchange and polymerization of this polymer are carried out as in Example 3. The resulting polymer has an inherent viscosity of 0.58. Amorphous film of the polyester is bright amber colored.

EXAMPLE 5

Preparation of Poly(ethylene terephthalate) Copolymer Containing 3.5 Mole % 1,4-Cyclohexanedimethanol and 0.9 Wt. % Lignin A total of 97 g (0.5 moles) dimethyl terephthalate, 2.52 g (0.0175 moles) 1,4-cyclohexanedimethanol (70% trans isomer, 30% cis isomer), 60.9 g 0.9825 moles) ethylene glycol, 0.88 g (0.9 wt %) lignin, and 0.29 mL of a n-butanol solution of acetyltriisopropyl titanate which contains 0.03 g titanium per mL is placed in a 500 mL, single-neck, round-bottom flask equipped with a nitrogen inlet, stirrer, vacuum outlet, and a condensing flask. The ester interchange and polycondensation of this polymer are carried out as in Example 3. The resulting polymer has an inherent viscosity of 0.60. Amorphous film of the polyester is bright amber colored. Gas chromatographic analyses on a hydrolyzed sample of the polyester show that the polyester contains 3.5 mole % 1,4-cyclohexanedimethanol.

EXAMPLE 6

Preparation of Poly(ethylene terephthalate) Copolymer Containing 31 Mole % 1,4-Cyclohexanedimethanol and 0.6 wt % of Lignin Propionate A total of 97 g (0.5 moles) dimethyl terephthalate, 23 g (0.16 moles) 1,4-cyclohexanedimethanol (70% trans isomer, 30% cis isomer), 52.1 g (0.84 moles) ethylene glycol, 0.66 g (0.6 wt. %) lignin propionate, and 0.33 mL of a n-butanol solution of acetyltriisopropyl titanate which contains 0.03 g titanium per mL is placed into a 500-mL, single-neck, round-bottom flask equipped with a nitrogen inlet, stirrer, vacuum outlet, and a condensing flask. The flask and contents are heated at 200° C. for 120 minutes and at 225° C. for 70 minutes with a nitrogen sweep over the reaction mixture. When the theoretical amount of methanol has distilled from the reaction mixture, the metal bath temperature is increased to 275° C. The flask is heated at 275° C. at a reduced pressure of 0.5 to 0.1 mm mercury for 80 minutes. The flask is removed from the bath and is allowed to cool in a nitrogen atmosphere. Film of the resulting amorphous polymer is bright amber colored. The polymer has an inherent viscosity of 0.76. Gas chromatographic analyses on a hydrolyzed sample of the polyester show that the polyester contains 31 mole % 1,4-cyclohexanedimethanol.

EXAMPLE 7

Preparation of Poly(hexamethylene terephthalate) Copolymer Containing 20 Mole % 1,4-Butanediol and 0.6 Wt. % of Lignin Butyrate A total of 97 g (0.5 moles) dimethyl terephthalate, 85 g (0.72 moles) 1,6-hexanediol, 25.2 g (0.28 moles) 1,4-butanediol, 0.73 g (0.6 wt %) lignin butyrate, and 2.28 mL of n-butanol solution of titanium tetraisopropoxide which contains 0.0053 g Titanium per mL placed into a 00-mL, single-neck, round-bottom flask equipped with a nitrogen inlet, stirrer, vacuum outlet, and a condensing flask. The flask and contents are heated at 200° C. for 60 minutes and at 210° C. for 120 minutes with a nitrogen sweep over the reaction mixture. When the theoretical amount of methanol has distilled from the reaction mixture the metal bath temperature is increased to 260° C. The flask is heated at 260° C. at a reduced pressure of 0.5 to 0.1 mm mercury for 62 minutes. The flask is removed from the bath and is allowed to cool in a nitrogen atmosphere while the copolyester crystallizes. Film of the polyester is amber colored. The polymer has an inherent viscosity of 0.81. Gas chromatographic analyses of a hydrolyzed sample show that the polyester contains 20 25. mole %, 1,4-butanediol and 80 mole % 1,6-hexanediol. The polyester has a melting point of 130° C. and a heat of fusion of 9.4 calories per gram.

This invention has been described in detail with particular reference to certain preferred embodiments thereof, but it is to be understood that variations and modifications can be effected within the spirit of the invention and the scope of the invention is to be determined from the claims appended hereto.

It is claimed:

1. A shapable colored copolymer consisting essentially of a polyester having chemically linked into the polyester backbone color-imparting amounts of a compound selected from the group consisting of lignin and lignin compounds having functional groups chemically linkable into said polyester backbone; wherein said polyester comprises the polymeric reaction product of at least one diol, and at least one compound selected from aliphatic dicarboxylic acids, alicyclic dicarboxylic acids, aromatic dicarboxylic acids, esters of such dicarboxylic acids and anhydrides of such dicarboxylic acids.

2. A copolymer as claimed in claim 1 wherein said lignin compounds comprise lignin esters, lignin ethers containing free hydroxyl groups, carboxy lignins and hydroxyalkoxy lignins.

3. A copolymer as claimed in claim 2 wherein said polyester comprises at least one diol, and at least one compound selected from the group consisting of terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalene dicarboxylic acid, dimethyl esters of dicarboxylic acids, diethyl esters of dicarboxylic acids, dipropyl esters of dicarboxylic acids, and anhydrides of dicarboxylic acids.

4. A copolymer as claimed in claim 1 wherein said diols comprise from two to eighteen carbon atoms.

5. A copolymer as claimed in claim 1 wherein said diols comprise from two to twelve carbon atoms.

6. A copolymer as claimed in claim 4 wherein said diols comprise at least one diol selected from cis-cycloaliphatic diols and trans-cycloaliphatic diols.

7. A copolymer as claimed in claim 1 wherein said diols comprise at least one diol selected from ethylene glycol, 1,4-cyclohexanedimethanol, 1,2-propanediol, 1,3-propanediol, 1,2-butanediol, 1,3-butanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, 3,8-bis(hydroxymethyl)tricyclo-[5.2.1.0]-decane, 4,8-bis(hydroxymethyl)tricyclo-[5.2.1.0]-decane, 5,8-bis(hydroxymethyl)tricyclo-[5.2.1.0]-decane, diethylene glycol, triethylene glycol, dipropylene glycol, and tripropylene glycol.

8. A copolymer as claimed in claim 1 wherein the amount of said lignin and lignin compounds comprises between 0.05 and 10.0 weight percent of said colored copolymer.

9. A copolymer as claimed in claim 8 wherein the amount of said lignin and lignin compounds comprises between 0.1 and 5.0 weight percent of said colored copolymer.

10. A copolymer as claimed in claim 9 wherein said polyester is selected from the group consisting of linear polyesters, thermoplastic polyesters, crystalline polyesters and amorphous polyesters.

11. A copolymer as claimed in claim 9 wherein said polyester is a linear thermoplastic polyester and said diol comprises at least 50 mole percent of ethylene glycol or 1,4-cyclohexanedimethanol and said dicarboxylic acid comprises at least 50 mole percent terephthalic acid.

12. A copolymer as claimed in claim 2 wherein said lignin compound is selected from the group consisting of lignin acetate, lignin propionate, lignin butyrate, lignin ethyl ether containing free hydroxyl groups, lignin methyl ether containing free hydroxyl groups, carboxymethyl lignin, (hydroxyethoxy) lignin, and (hydroxypropoxy) lignin.

13. A process for preparing a copolymer consisting essentially of a polyester having chemically linked into the polyester backbone color-imparting amounts of a compound selected from the group consisting of lignin and lignin compounds having functional groups chemically linkable into said polyester backbone, said process comprising the steps of:
polymerizing at least one diol with at least one compound selected from aliphatic dicarboxylic acids, alicyclic dicarboxylic acid, aromatic dicarboxylic acids, esters of such dicarboxylic acids and anhydrides of such dicarboxylic acids in the presence of a color-imparting amount of a compound selected from lignin and lignin compounds which can be chemically linked into said polyester backbone and recovering the resultant polyester.

14. A process as claimed in claim 13 wherein said lignin and lignin compounds are present in an amount between 0.1 and 5.0 weight percent.

15. A process as claimed in claim 14 wherein said lignin compound is selected from the group consisting of lignin acetate esters, lignin propionate esters and lignin butyrate esters.

16. A process as claimed in claim 14 wherein the diol is selected from the group consisting of ethylene glycol and 1,4-cyclohexanedimethanol.

17. An article of manufacture comprised of:
a shapable amber-colored copolymer consisting essentially of a polyester having chemically linked into the polyester backbone color-imparting amounts of a compound selected from the group consisting of lignin and lignin compounds having functional groups chemically linkable into said polyester backbone; wherein said polyester comprises the polymeric reaction product of at least one diol, and at least one compound selected from aliphatic dicarboxylic acids, alicyclic dicarboxylic acids, aromatic dicarboxylic acids, esters of such dicarboxylic acids and anhydrides of such dicarboxylic acids.

18. An article of manufacture as claimed in claim 17 wherein said lignin compounds comprise lignin esters, lignin ethers containing free hydroxy groups, carboxy lignins and hydroxyalkoxy lignins.

19. An article of manufacture as claimed in claim 18 wherein said copolymer comprises at least one diol, and at least one compound selected from the group consisting of terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalene dicarboxylic acid, dimethyl esters of dicarboxylic acids, diethyl esters of dicarboxylic acids, dipropyl esters of dicarboxylic acids, and anhydrides of dicarboxylic acids.

20. An article of manufacture as claimed in claim 17 wherein said diols have two to eighteen carbon atoms.

21. An article of manufacture as claimed in claim 17 wherein said diols have two to twelve carbon atoms.

22. An article of manufacture as claimed in claim 20 wherein said diols comprise at least one diol selected from cis-cycloaliphatic diols and trans-cycloaliphatic diols.

23. An article of manufacture as claimed in claim 17 wherein said diols comprise at least one diol selected from ethylene glycol, 1,4-cyclohexanedimethanol, 1,2-propanediol, 1,3-propanediol, 1,2-butanediol, 1,3-butanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, 3,8-bis(hydroxymethyl)tricyclo-[5.2.1.0]-decane, 4,8-bis(hydroxymethyl)tricyclo-[5.2.1.0]-decane, 5,8-bis(hydroxymethyl)tricyclo-[5.2.1.0]-decane, diethylene glycol, triethylene glycol, dipropylene glycol, and tripropylene glycol.

24. An article of manufacture as claimed in claim 17 wherein the amount of said lignin and lignin compounds comprises between 0.05 and 10.0 weight percent of said colored copolymer.

25. An article of manufacture as claimed in claim 17 wherein the amount of said lignin and lignin compounds comprises between 0.1 and 5.0 weight percent of said colored copolymer.

26. An article of manufacture as claimed in claim 25 wherein said polyester is selected from the group consisting of linear polyesters, thermoplastic polyesters, crystalline polyesters and amorphous polyesters.

27. An article of manufacture as claimed in claim 26 wherein said polyester is a linear thermoplastic polyester.

* * * * *